US008858673B2

(12) United States Patent
Kweeder

(10) Patent No.: US 8,858,673 B2
(45) Date of Patent: Oct. 14, 2014

(54) COMPOSITIONS AND METHODS TO DETER ILLICIT USES OF FERTILIZERS

(75) Inventor: James Kweeder, Chesterfield, VA (US)

(73) Assignee: Honeywell International Inc., Morristown, NJ (US)

( * ) Notice: Subject to any disclaimer, the term of this patent is extended or adjusted under 35 U.S.C. 154(b) by 395 days.

(21) Appl. No.: 13/207,017

(22) Filed: Aug. 10, 2011

(65) Prior Publication Data

US 2012/0036908 A1  Feb. 16, 2012

Related U.S. Application Data

(60) Provisional application No. 61/372,698, filed on Aug. 11, 2010, provisional application No. 61/372,651, filed on Aug. 11, 2010, provisional application No. 61/372,668, filed on Aug. 11, 2010.

(51) Int. Cl.

| C05C 9/00 | (2006.01) |
|---|---|
| C05C 5/00 | (2006.01) |
| C05C 5/02 | (2006.01) |
| C05C 5/04 | (2006.01) |
| C05B 7/00 | (2006.01) |
| C05D 9/00 | (2006.01) |
| C05G 3/00 | (2006.01) |
| C05C 3/00 | (2006.01) |
| C05C 1/02 | (2006.01) |
| C05C 1/00 | (2006.01) |
| C05D 9/02 | (2006.01) |

(52) U.S. Cl.
CPC ............... C05C 1/00 (2013.01); C05G 3/0041 (2013.01); C05C 3/00 (2013.01); C05C 3/005 (2013.01); C05C 1/02 (2013.01); C05G 3/00 (2013.01); C05C 5/00 (2013.01); C05D 9/02 (2013.01)
USPC ............... 71/31; 71/28; 71/34; 71/58; 71/63; 71/64.07

(58) Field of Classification Search
USPC ............................................. 71/28–63, 64.07
See application file for complete search history.

(56) References Cited

U.S. PATENT DOCUMENTS

| 2,901,317 | A | * | 8/1959 | Marti, Jr. ...................... 423/267 |
| 3,366,468 | A | | 1/1968 | Porter |
| 3,368,929 | A | * | 2/1968 | Bell ............................... 149/46 |
| 3,554,731 | A | * | 1/1971 | Madany et al. .................... 71/59 |
| 5,964,917 | A | * | 10/1999 | Latting ............................. 71/49 |
| 6,669,753 | B1 | | 12/2003 | Chambers et al. |
| 6,689,181 | B2 | | 2/2004 | Highsmith et al. |
| 2006/0243010 | A1 | | 11/2006 | Sanders et al. |
| 2007/0199357 | A1 | | 8/2007 | Kweeder et al. |
| 2009/0113966 | A1 | | 5/2009 | Kweeder |
| 2010/0254880 | A1 | | 10/2010 | Kweeder et al. |

FOREIGN PATENT DOCUMENTS

| WO | 2007084873 A2 | 7/2007 |
| WO | 2012021663 A2 | 2/2012 |

OTHER PUBLICATIONS

International Search Report mailed Mar. 26, 2012 in International Application No. PCT/US2011/047346.

* cited by examiner

*Primary Examiner* — Wayne Langel
(74) *Attorney, Agent, or Firm* — Faegre Baker Daniels LLP

(57) ABSTRACT

Fertilizers may include one or more additives that render the fertilizer more resistant to further processing such as thermal processing and/or aqueous-based processing that may otherwise be employed in the attempt to produce explosive materials from the fertilizer. The one or more additives may include materials that increase the chances of detection by providing a visual or olfactory indication of further processing. The one or more additives may include materials that make further processing more difficult or dangerous.

19 Claims, No Drawings

COMPOSITIONS AND METHODS TO DETER ILLICIT USES OF FERTILIZERS

CROSS-REFERENCE TO RELATED APPLICATIONS

This application claims priority to Provisional Application No. 61/372,698, entitled "ADDITIVES TO DETER ILLICIT USE OF FERTILIZERS," filed Aug. 11, 2010; Provisional Application No. 61/372,651, entitled "METHODS FOR ADDING TRACERS TO FERTILIZERS," filed Aug. 11, 2010; and Provisional Application No. 61/372,668, entitled "ADDITIVES FOR DETECTION OF ILLICIT USE OF FERTILIZERS," filed Aug. 11, 2010, each of which are herein incorporated by reference in their entirety.

TECHNICAL FIELD

The present technology relates to fertilizers, such as ammonium nitrate containing fertilizers. More particularly, the present technology relates to additives that can included in fertilizers to deter or interfere with further processing of the fertilizers to produce explosive devices.

BACKGROUND

It is well known that, because of its high concentration of nitrate ions, ammonium nitrate has important uses in the field of agriculture in general and fertilization in particular. However, in many of the forms in which it ammonium nitrate fertilizers are commonly used, it is relatively difficult and potentially hazardous to handle commercially in large amounts, and/or to store in great masses (such as occur in commercial warehouses and storage bins), especially for relatively long periods of time. Furthermore, certain forms of ammonium nitrate may detonate under certain conditions, and have therefore sometimes been illicitly used as an explosive material.

Many fertilizer products require additional processing in order to render them useful in an explosive device. For example, fertilizers can be processed to enrich or separate the ammonium nitrate content by chemical purification methods. Such processing can include, for example, thermal processing and aqueous-based processing.

SUMMARY

Fertilizers according to embodiments of the present invention include one or more additives that deter further processing of the fertilizer into an explosive device. In one embodiment, the additives render the fertilizers resistant to further processing such as thermal processing and/or aqueous-based processing that may otherwise be employed in the attempt to produce explosive materials from the fertilizer. In another embodiment, the one or more additives increase the chances of detection of further processing by providing a visual or olfactory indication during processing. Methods of forming fertilizers that include such additives are also disclosed.

While multiple embodiments are disclosed, still other embodiments of the present invention will become apparent to those skilled in the art from the following detailed description, which shows and describes illustrative embodiments of the invention. Accordingly, the description is to be regarded as illustrative in nature and not restrictive.

DETAILED DESCRIPTION

Fertilizers according to embodiments of the present invention include one or more additives that render further processing more detectable. Fertilizers according to other embodiments may include one or more additives that deter, complicate or inactivate further processing of the fertilizer to produce explosive components. Additive combinations may also be employed.

Fertilizers containing nitrates, ammonium, urea and other known fertilizing compounds can be further processed via any one of a number of routes for producing illicit explosive materials. One such processing route utilizes thermal processing at temperatures in excess of about 50 or 60 degrees Celsius. Another processing route utilizes chemical processing, which may include at least one aqueous processing step. Accordingly, in one embodiment, the fertilizer includes an additive that activates under the thermal processing, aqueous processing or both. In another embodiment the fertilizer includes a combination of additives that activate under either processing condition.

Components to Detect Further Processing

In some embodiments, fertilizers may include one or more additives that facilitate the identification of illicit activities such as processing fertilizers to make explosive devices, including, for example, improvised explosive devices (IEDs). These additives may be any suitable material, and can be selected to provide any desired property that can be identified by security personnel. For example, the additive may include a thermal decomposition or reaction product of the additive that may emitted from the fertilizer when the fertilizer is heated in a further processing step.

In some instances, the additive or thermal decomposition or reaction product thereof may be selected such that it is emitted at a temperature that is above that of any expected storage conditions yet is within temperatures that would be expected to be encountered during further processing steps. In some embodiments, the additive is selected such that is emitted or reacts at a temperature at or above about 50 or 60 degrees Celsius. While a single additive may be referred to for simplicity, it will be appreciated that any number of additives, either having similar or dissimilar detection and/or deterrent functionality, may be used.

In some embodiments, the additive may have a pyrotechnic effect during thermal processing. For example, the additive may be a pyrotechnic "star" containing components known to produce an intense light when ignited. Suitable compounds include phosphorous, strontium carbonate, lithium carbonate, lithium chloride, calcium chloride, sodium nitrate, barium chloride, copper chloride, cesium nitrate, potassium nitrate, rubidium nitrate, charcoal, iron, lampblack, titanium, aluminum, beryllium, magnesium and combinations thereof.

In some embodiments, the additive may produce a colored smoke or vapor when the fertilizer is heated, thereby providing an indication to law enforcement that someone is attempting to further process the fertilizer. Examples of additives that can produce a colored or otherwise visible smoke or vapor include "smoke bombs," which include an oxidizer such as potassium chlorate, a fuel such as sugar a moderant such as sodium bicarbonate and a powdered organic dye.

In some embodiments, the additive may produce a distinctive odor that can easily be detected by humans when the fertilizer is heated or processed under aqueous conditions. Examples of suitable odorous additives include organic thiols or mercaptans. These materials may, when contacted with water, react and decompose to release hydrogen sulfide gas. Hydrogen sulfide gas is highly odorous and is easily detected by humans. Other examples include nitrogen-bearing compounds such as pyridines and pyroles. These materials may, when contacted with water, react to provide gaseous products having a distinctive fish-like odor.

Further embodiments include certain linear carboxylic acids or other higher molecular weight acids, which are distinctly malodorous. Illustrative examples of malodorous linear carboxylic acids include acetic acid (vinegar smell) and butanoic acid (rancid butter smell). Lower molecular weight acids such as butyric acid and valeric acid are heavy liquids that can be encapsulated. Certain higher molecular weight acids that are powders at ambient temperature but can dissolve and evolve odorous gases when contacted with water may also be suitable.

In some embodiments, if an ASN fertilizer is being subjected to an aqueous processing step, an ammonium/acid ion combination is formed. The addition of a sufficiently strong base can cause malodorous ammonia gas to be released as the base is dissolved. A suitable base is limestone, which can be mixed in with the dry fertilizer in a granular form. In some embodiments, a milder base may be used if a metal chloride compound (such as iron chloride) is present. In some embodiments, using a plain metal chloride can cause HCl gas to be evolved.

In some embodiments, the additive may provide a less-noticeable, or covert, indication that the fertilizer is being heated or is otherwise being subjected to further processing. The additive or thermal decomposition or reaction product thereof may not be emitted at a concentration that is detectable by humans, but may be detectable by an electronic detector or by a dog. Examples of additives that may not be overtly detected by humans but may be detectable by dogs include pheromones. In some embodiments, the pheromones may be encapsulated in a water-soluble coating that will dissolve upon aqueous processing. Other examples of relatively covert detection additives include those that may fluoresce in specific types of light such as ultraviolet light, or additives can be an identifiable compound that can be detected through analysis of the air or of an article that has been exposed to the additive.

In some embodiments, the fertilizer may include a component that may be detectable absent any further processing. In some embodiments, the fertilizer may include an easily detectable component that may provide an indication that the fertilizer is in an unexpected location. For example, one would not be surprised or alarmed to discover fertilizer in a farmer's barn. However, finding a large quantity of fertilizer in someone's urban garage may be an indication of illicit use.

In some embodiments, the fertilizer may include a component such as the detection chemicals that are frequently added to commercially available explosives so that bomb-sniffing dogs can detect the explosives. An example of an additive that may be detected at low concentrations by dogs or by electronic detectors include t-butyl mercaptan, which is commonly added to natural gas (which is otherwise odorless) for leak detection. While a large cache of fertilizer may masquerade as a natural gas leak, the resulting law enforcement investigation would likely uncover the fertilizer.

In some embodiments, the emitted additive or thermal decomposition or reaction product thereof, can drift in the air and be detectable by security personnel. In some embodiments, it can interact with the skin and/or clothing of people in the vicinity. For example, a colored vapor may cause staining of clothes or skin, or both. An odorous additive can interact with or cling to clothing, or skin, or both.

In certain embodiments, the fertilizer includes at one thermally activated additive and at least one additive activated or release under aqueous conditions. For example, the fertilizer may include at least one pyrotechnic or smoke producing additive and at least one odorous material.

Components to Deter Further Processing

In some embodiments, fertilizers may include one or more additives that deter the further processing of fertilizers in making explosive devices, including, for example, improvised explosive devices (IEDs). Additives can be any suitable additive that can interfere with processing of a fertilizer product. For example, additives can induce a thermal reaction when the fertilizer is processed, such as being subjected to a purification or chemical separation process, which can include heating the fertilizer.

In some embodiments, the additive may be selected to reduce the stability of the ammonium nitrate in the fertilizer. Illustrative but non-limiting examples of suitable additives include halides, transition metal ions and combinations thereof. Examples of halides include fluorides, chlorides, bromides and iodides. Examples of transition metals include in particular zinc and copper. These materials can be added applied to the fertilizer either during the fertilizer manufacturing process, or post-manufacture.

In certain embodiments, the fertilizer includes at least one detectable additive and at least one deterrent additive. For example, the fertilizer may include at least one pyrotechnic, smoke producing or odor producing material and at least one deterrent such as a transition metal ion.

In some embodiments, urea may be illicitly processed in an attempt to make an explosive material. If one is attempting to form urea nitrate, the amine functionality on the urea molecule is protonated by treating with concentrated nitric acid. If one is attempting to form nitrourea, the urea is protonated with concentrated sulfuric acid, followed by contacting with concentrated nitric acid. In either event, strong acid protonation is a step that may be exploited in designing a deterrent to these reaction paths.

In some embodiments, the strong acid protonation step could be made more difficult by including a basic material. In some embodiments, a material can be added that will react with the strong acids to form undesirable materials or even provide an undesired (by the illicit processor) that is sufficiently exothermic to cause a fire.

Fertilizers

A wide variety of fertilizers may be used with the additives of the present invention. Illustrative but non-limiting examples of fertilizers that may be used include compounds containing nitrate groups, ammonium groups and urea groups. Examples of nitrate fertilizers include but are not limited to ammonium nitrate, ammonium sulfate nitrate, calcium nitrate, potassium nitrate, sodium nitrate, and calcium ammonium nitrate. Examples of ammonium fertilizers that do not contain nitrate groups include ammonium sulfate and ammonium phosphate. Due to the known detonation capabilities of ammonium nitrate, fertilizers that include ammonium nitrate or derivatives thereof are of particular importance. Examples include calcium ammonium nitrate and ammonium nitrate/ammonium phosphate mixtures such as those described in U.S. Pat. No. 3,366,468, which is incorporated by reference herein in its entirety. Another example of an ammonium nitrate ("AN") fertilizer is ammonium sulfate nitrate. Although more processing is required, ammonium and urea fertilizers (or other fertilizers) that do not contain nitrate groups in their intended form can be chemically converted to include nitrates.

In some embodiments, AN fertilizers may be provided primarily in the form of an ammonium nitrate double salt. As used herein, the term "double salt" is refers to a salt made up of at least two different types of cations and one type of anion or of at least two different types of anions and one type of cation. Thus, the term "double salt of ammonium nitrate" is understood to mean a combination of ammonium nitrate and another compound in such a way as to form new compound whose crystalline structure is distinct from the either of the constituents.

In some embodiments, an ammonium nitrate double salt may include ammonium nitrate and at least a second compound, said second compound being present under conditions and in amounts effective to substantially reduce the detonation sensitivity of the composition and/or to otherwise improve a desired property of the composition. In some embodiments, the second compound is one or more of ammonium sulfate, ammonium phosphate, calcium nitrate, potassium nitrate, magnesium nitrate, ammonium molybdenate, ammonium hexafluoralsilicate, neodymium hydroxynitrate, or combinations of two or more of these. In some embodiments, at least a substantial portion of the ammonium nitrate in the composition is in the form of a double salt with one or more of said second compounds.

In some embodiments the compositions, including the fertilizers and other materials of the present invention, have a relatively low concentration of single salt AN. As used herein the term "single AN" refers to a salt in which substantially all of the cations are ammonium and substantially all of the anions are nitrate. In some embodiments the compositions and materials of the present invention have no substantial amount of single salt AN, and in certain embodiments the compositions contain not more than trace amounts of single salt AN.

In some embodiments, the present compositions, particularly in the form of fertilizers and when used in connection with methods involving handling the fertilizers, are not considered hazardous materials under Title 49 of the Code of Federal Regulations, "Transportation", Part 172, "Hazardous Materials Table", Oct. 1, 2000, and are also preferably not classified as oxidizers under United Nations Recommendations on the Transport of Dangerous Goods, Manual of Tests and Criteria, 1995", "Section 34, Classification Procedures, Test Methods and Criteria Relating to Oxidizing Substances of Division 5.1".

In some embodiments, the double salts may be of the formula (I):

$$(M)n(NH_4NO_3)m(H_2O) \qquad (I),$$

where M is a cation-anion pair such as ammonium phosphate, calcium nitrate, potassium nitrate, magnesium nitrate, ammonium molybdenate, ammonium hexafluoralsilicate or neodymium hydroxynitrate, n is from about 0.2 to about 3, and m is from about 0 to about 10. Ammonium sulfate nitrate (ASN) is an exemplary double salt. Further information pertaining to these double salts may be found in U.S. Patent Publication No. 2007/0199357, which is incorporated by reference herein in its entirety. Further illustrative examples of double salts, their formation and their properties may be found in U.S. Pat. No. 6,689,181, which is incorporated by reference herein in its entirety.

Although the AN double salts described herein are substantially more stable than their single salt counterparts, it is still possible through thermal processing or purification techniques to form illicit materials for use in explosive devices. Accordingly, in one embodiment, a fertilizer composition of the present invention includes at least one AN double salt such as an ASN double salt and at least one additive described herein. In another embodiment, the fertilizer composition includes at least about 60 wt % of an AN double salt and at least one additive.

Manufacturing Process

The fertilizers of the present invention can be manufactured by any suitable process to form liquid or solid fertilizers. For example, solid fertilizers may be formed by known granulation or prilling techniques. The additives may be added to the fertilizers in any number of ways either during the fertilizer manufacturing process, or post-manufacture, including by direct mixing, discrete encapsulation and by coating/soaking of fertilizer particulates.

When the additives are added during the fertilizer manufacturing process they are a component of the manufactured fertilizer product. Additives can be added at any suitable point during the manufacturing process. For example, the additive can be added to a liquid melt prior to the liquid melt being provided to a prilling tower. Additives can be added during the fertilizer manufacturing process in any suitable manner, including, for example, addition of a additive as a stand-alone component, or addition of a additive in an additive mixture that includes one or more additives and a solvent.

In some embodiments, the additive may be added to the fertilizer as a discrete microencapsulated liquid, powder or granule. The encapsulation layer containing the additive may be dissolve upon thermal or aqueous processing according to one embodiment. In some embodiments, the additive may be encapsulated before it is added to the fertilizer. In some embodiments, encapsulating the additive in a water-soluble coating prevents the additive from being prematurely released or reacted prior to someone subjecting the fertilizer to aqueous-based further processing. Examples of suitable water-soluble coating materials include gelatins and cellulosic materials.

Encapsulation is a process in which tiny particles or droplets are surrounded by a coating to give small capsules many useful properties. In a relatively simplistic form, a microcapsule is a small sphere with a uniform wall around it, although many microcapsules have a non-spherical core that may be a crystal, a jagged adsorbent particle, an emulsion, a suspension of solids, or a suspension of smaller microcapsules. Most microcapsules have diameters between a few micrometers and a few millimeters.

There are a number of different processes that can be used for microencapsulation. These processes include but are not limited to pan coating, air-suspension coating, centrifugal extrusion, core-shell encapsulation, spray-drying and a variety of chemical processes.

When additives are added in a post-manufacture process, the additives can be applied directly to a fertilizer product. In such processes, manufactured fertilizer products can be provided from one or more sources, and can be treated in order to add the additives. In some embodiments, the additives are provided in an additive mixture that includes an additive and a solvent. Additive mixtures can include one or more additives, and can include any suitable combination of additives for the intended application.

Accordingly, one example of a method for adding a tracer to a fertilizer can include providing an additive mixture and applying the mixture to a fertilizer to form a treated fertilizer product. The additive mixture can include at least one additive, and may also include a solvent. In one example, application of the additive mixture can include spraying the additive mixture onto the fertilizer product. The step of applying the additive mixture to the fertilize product can include combining the additive mixture and the fertilizer product, and mixing the additive mixture with the fertilizer product. Mixing can be accomplished in any suitable manner, including but not limited to stirring or agitating. Additional processing steps can also be used, such as, for example, drying of the treated fertilizer product after the additive has been applied.

In examples where the fertilizer product is a porous solid, the solvent may impart fluid and surface properties that allow the additive to penetrate into the fertilizer product. For example, the additive can be incorporated into the fertilizer product by physical absorption of the additive into the porous solid material of the fertilizer product.

In examples where the additive includes a coating, the coating material may be a liquid including the additive and a suitable solvent. Alternatively, a coating process such as described in U.S. Pat. No. 7,785,387, which is incorporated by reference in its entirety, may be employed. As described in the '387 patent, fertilizer granules are first coated with a dispersant material and then an overcoating material. For purposes of the present invention, the dispersant material could include the at least one additive described herein alone or in combination with an anti-caking material such as Zeolex 80, which is a sodium aluminum silicate powder. The overcoating material may include conventional dissolvable coatings such as wax, anti-caking material, water soluble materials and the like In some embodiments, the additives may be in powder or wax form and may be dissolved in at least one solvent in order to formulate the particular compound, prepare the compound for the application, or impart additional chemical properties to the compound. For example, a solvent or solvents may be utilized to impart a rougher or porous surface to the fertilizer granules, in order to naturally hold more of the applied additive.

Contemplated solvents include any suitable pure or mixture of organic molecules that are volatilized at a desired temperature. The solvent may include any suitable pure or mixture of polar and non-polar compounds. As used herein, the term "pure" means that component that has a constant composition. As used herein, the term "mixture" means that component that is not pure, including salt water. As used herein, the term "polar" means that characteristic of a molecule or compound that creates an unequal charge, partial charge or spontaneous charge distribution at one point of or along the molecule or compound. As used herein, the term "non-polar" means that characteristic of a molecule or compound that creates an equal charge, partial charge or spontaneous charge distribution at one point of or along the molecule or compound.

In some embodiments, the solvent or solvent mixture includes hydrocarbon solvents. While a majority of hydrocarbon solvents are non-polar, there are a few hydrocarbon solvents that could be considered polar. Hydrocarbon solvents are generally broken down into three classes: aliphatic, cyclic and aromatic. Aliphatic hydrocarbon solvents may include both straight-chain compounds and compounds that are branched and possibly crosslinked, however, aliphatic hydrocarbon solvents are not considered cyclic. Cyclic hydrocarbon solvents are those solvents that include at least three carbon atoms oriented in a ring structure with properties similar to aliphatic hydrocarbon solvents. Aromatic hydrocarbon solvents are those solvents that include generally three or more unsaturated bonds with a single ring or multiple rings attached by a common bond and/or multiple rings fused together.

Examples of hydrocarbon solvents include toluene, xylene, p-xylene, m-xylene, mesitylene, solvent naphtha H, solvent naphtha A, alkanes, such as pentane, hexane, isohexane, heptane, nonane, octane, dodecane, 2-methylbutane, hexadecane, tridecane, pentadecane, cyclopentane, 2,2,4-trimethylpentane, petroleum ethers halogenated hydrocarbons, such as chlorinated hydrocarbons, nitrated hydrocarbons, benzene, 1,2-dimethylbenzene, 2,4-trimethylbenzene, mineral spirits, kerosine, isobutylbenzene, methylnaphthatenes, ethyltouene, and igroine.

In other embodiments, the solvent or solvent mixture may include other solvents including ketones, such as acetone, diethyl ketone, methyl ethyl ketone and the like, alcohols, esters, ethers and amines In yet other embodiments, the solvent or solvent mixture may include a combination of any of the solvents mentioned herein.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

The following is claimed:

1. A fertilizer composition comprising:
a fertilizer material; and
at least one additive that inhibits thermal or chemical processing of the fertilizer material to form an explosive material, wherein the additive is microencapsulated.

2. The fertilizer composition of claim 1, wherein the fertilizer material comprises ammonium nitrate.

3. The fertilizer composition of claim 1, wherein the fertilizer material comprises an ammonium nitrate double salt.

4. The fertilizer composition of claim 1, wherein the fertilizer material comprises an ammonium sulfate nitrate double salt.

5. The fertilizer composition of claim 1, wherein the additive induces a thermal reaction when the fertilizer composition is processed.

6. The fertilizer composition of claim 1, wherein the additive reduces the stability of the fertilizer material when processed.

7. The fertilizer composition of claim 1, wherein the additive comprises a halide, a transition metal ion or a combination thereof.

8. The fertilizer composition of claim 1, wherein the additive comprises zinc or copper.

9. The fertilizer composition of claim 1, comprising a plurality of granules.

10. The fertilizer composition of claim 9, wherein the additive is dispersed in the granules.

11. The fertilizer composition of claim 9, wherein the fertilizer comprises at least a portion of the granules and the additive comprises a granule coating on the fertilizer granules.

12. The fertilizer composition of claim 1 further comprising at least a second additive which, upon thermal or chemical processing of the fertilizer material to form an explosive material, provides a visual, olfactory or electronically detectable indicator that such thermal or chemical processing has occurred.

13. A fertilizer composition comprising:
a fertilizer material;
at least one first additive that inhibits thermal or chemical processing of the fertilizer material to form an explosive material; and
at least one second additive that, upon thermal or chemical processing of the fertilizer material to form an explosive material, provides an olfactory signal that such thermal or chemical processing has occurred.

14. The fertilizer composition of claim 12, wherein the second additive comprises a material that provides a visual indicator.

15. A method of making a fertilizer comprising:
combining an ammonium nitrate containing fertilizer material with an additive mixture containing an organic solvent and at least one additive which, upon thermal or chemical processing of the ammonium nitrate containing fertilizer to form an explosive material, inhibits thermal or chemical processing of the ammonium nitrate containing fertilizer material to form an explosive material; and drying the combined fertilizer material and additive mixture;

wherein the fertilizer material comprises granules, the additive comprises discrete encapsulates and the combining step comprises mixing the granules and the encapsulates.

16. The method of claim 15, wherein the fertilizer material comprises ammonium nitrate.

17. The method of claim 15, wherein the fertilizer material comprises granules, the additive comprises a coating material and the combining step comprises coating the granules with the coating material.

18. The method of claim 15, wherein combining the ammonium nitrate containing fertilizer material with the additive comprises mixing the additive with a solvent to form an additive mixture and combining the additive mixture with the ammonium nitrate containing fertilizer material.

19. The method of claim 15, further comprising combining combined fertilizer material and additive mixture with a second additive that, upon thermal or chemical processing of the fertilizer material to form an explosive material, provides a visual, olfactory or electronically detectable indicator that such thermal or chemical processing has occurred.

* * * * *